(12) United States Patent
Lynch (10) Patent No.: US 9,535,151 B2
(45) Date of Patent: Jan. 3, 2017

(54) CODED APERTURE BEAM ANALYSIS METHOD AND APPARATUS

(71) Applicant: HRL Laboratories, LLC, Malibu, CA (US)

(72) Inventor: Jonathan J. Lynch, Oxnard, CA (US)

(73) Assignee: HRL Laboratories, LLc, Malibu, CA (US)

( * ) Notice: Subject to any disclaimer, the term of this patent is extended or adjusted under 35 U.S.C. 154(b) by 202 days.

(21) Appl. No.: 13/725,621

(22) Filed: Dec. 21, 2012

(65) Prior Publication Data

US 2013/0169485 A1 Jul. 4, 2013

Related U.S. Application Data

(63) Continuation-in-part of application No. 13/490,607, filed on Jun. 7, 2012, now abandoned.

(60) Provisional application No. 61/580,997, filed on Dec. 28, 2011.

(51) Int. Cl.
| | |
|---|---|
| *G01S 3/72* | (2006.01) |
| *G01S 3/46* | (2006.01) |
| *G01S 13/66* | (2006.01) |
| *G01S 13/02* | (2006.01) |

(52) U.S. Cl.
CPC .. *G01S 3/72* (2013.01); *G01S 3/46* (2013.01); *G01S 13/66* (2013.01); *G01S 2013/0245* (2013.01)

(58) Field of Classification Search
CPC ........ G01S 13/003; G01S 13/06; G01S 13/08; G01S 13/66; G01S 2013/0245; G01S 3/46; G01S 3/72; A45D 19/02; A45D 24/04; A45D 44/08
USPC .......................................................... 342/417
See application file for complete search history.

(56) References Cited

U.S. PATENT DOCUMENTS

| | | | |
|---|---|---|---|
| 3,852,753 | A | 12/1974 | Blakemore |
| 5,940,029 | A | 8/1999 | Ninomiya |
| 5,945,947 | A | 8/1999 | Cunningham |
| 5,955,985 | A | 9/1999 | Kemkemian |
| 6,266,010 | B1 | 7/2001 | Ammar |
| 6,384,784 | B1 | 5/2002 | Gumm |

(Continued)

OTHER PUBLICATIONS

PCT International Preliminary Report on Patentability (Chapter II) mailed on Feb. 27, 2014 for related PCT Application No. PCT/US2012/071501 (20 pages).

(Continued)

*Primary Examiner* — Timothy A Brainard
(74) *Attorney, Agent, or Firm* — Ladas & Parry (57) ABSTRACT

A method and apparatus for determining the range, radial velocity, and bearing angles of scattering objects reflecting RF signals or for determining the range, radial velocity, and bearing angles of sources RF signals. An array of antenna elements is utilized, the array of antenna elements each having an associated two state modulator wherein transmitted and/or received energy is phase encoded according to a sequence of multibit codes, the bits of the multibit codes each preferably having two states with approximately a 50% probability for each of the two states occurring within each given multibit code in said sequence of multibit codes, thereby allowing the determination of range, radial velocity, and bearing angles through digital computation after the scattered signals have been received.

31 Claims, 6 Drawing Sheets

(56) References Cited

U.S. PATENT DOCUMENTS

| | | | |
|---|---|---|---|
| 6,914,559 | B2 | 7/2005 | Marks |
| 7,151,478 | B1* | 12/2006 | Adams .................. G01S 13/325 244/3.1 |
| 7,224,314 | B2 | 5/2007 | Lee |
| 7,277,046 | B2* | 10/2007 | Adams ...................... G01S 3/30 342/126 |
| 2003/0025629 | A1 | 2/2003 | Barrick |
| 2004/0252047 | A1* | 12/2004 | Miyake .................. G01S 13/34 342/107 |
| 2005/0275585 | A1 | 12/2005 | Shima |
| 2008/0129595 | A1* | 6/2008 | Choi et al. .................... 342/368 |
| 2009/0079617 | A1 | 3/2009 | Shirakawa |
| 2009/0103593 | A1 | 4/2009 | Bergamo |
| 2009/0251361 | A1 | 10/2009 | Beasley |
| 2009/0310649 | A1* | 12/2009 | Fisher .................. H04B 1/7075 375/141 |
| 2013/0169471 | A1 | 7/2013 | Lynch |

OTHER PUBLICATIONS

Dr. Marcos A. Bergamo. 2010. "Spread Spectrum Digital Beamforming (SSDBF) Radar." IEEE. pp. 665-672.

"EW 101: A First Course in Electronic Warfare" by David Adamy, published by Artech House.

"Multiple Emitter location and Parameter Estimation", R. O. Schmidt, IEEE Trans. Ant. Prop. vol. AP-34, No. 3, Mar. 1986).

U.S. Appl. No. 13/490,607, filed Jun. 7, 2012, Lynch.

U.S. Appl. No. 61/580,997, filed Dec. 28, 2011, Lynch.

M. I. Skolnik, "Introduction to radar systems (third edition)," McGraw-Hill, NY, 2001, Section 5.2, pp. 276-284 and pp. 305 to 309.

Adamy, D., "EW 103 Tactical Battlefield Communication Electronic Warfare" published by Artech House (pp. 209, 211, 212, and 214) with relevance to "EW 101: A First Course in Electronic Warfare" also published by Artech House.

PCT International Search Report and Written Opinion mailed on Sep. 27, 2013 for related PCT Application No. PCT/US2012/071501 (12 pages).

From U.S. Appl. No. 13/490,607 (now published as US 2013-0169471 A1), Office Action mailed on Nov. 28, 2014.

Drabowitch, S., et al. "Pattern compression by space-time binary coding of an array antenna", North Atlantic Treaty Organization, AGARD Conference Proceedings, No. 66, Advanced Radar Systems, 1970 (10 pages).

Office action from related Chinese Patent Application No. 201280064222.9 dated Oct. 23, 2015 with brief English summary.

EPO Supplementary European Search Report from European Patent Application No. 12872244.4 dated Aug. 21, 2015.

EPO Office Action from European Patent Application No. 12872244.4 dated Sep. 3, 2015.

EPO Extended Search Opinion from European Patent Application No. 12872244.4 dated Sep. 25, 2015 with EPO transmittal letter of Sep. 28, 2015.

PCT International Search Report and Written Opinion from PCT/US2014/068669 dated Aug. 28, 2015.

* cited by examiner

FIG. 1 plot of "y" parameter vs. angular direction φ (deg).

FIG. 2

Instantaneous Frequency (FMCW)

CODED APERTURE BEAM ANALYSIS METHOD AND APPARATUS

CROSS REFERENCE TO RELATED APPLICATIONS

This application claims the benefit of U.S. Provisional Patent Application Ser. No. 61/580,997 filed Dec. 28, 2011, entitled "Coded Aperture Beam Analysis Method and Apparatus", the disclosure of which is hereby incorporated by reference.

This application is also a continuation-in-part of U.S. patent application Ser. No. 13/490,607 filed Jun. 7, 2012, entitled "Coded Aperture Beam Analysis Method and Apparatus", the disclosure of which is also hereby incorporated by reference.

TECHNICAL FIELD

This technology reduces the time required for a phased array radar to form estimates of range, radial velocity, and bearing angles of scattering objects over a wide field of view.

BACKGROUND

Prior art direction finding methods include:
(i) A conventional electronic support measure typically utilizes a small sparse array (e.g., 16 elements) of broadband antennas (e.g., spirals) that are non-uniformly spaced, each equipped with a separate receiver to collect and demodulate incoming signals. By analyzing the relative amplitudes and phases of the received signals, their angles of arrival may be determined. This approach is described in "EW 103 Tactical Battlefield Communication Electronic Warfare" by David Adamy, published by Artech House. An advantage of the present technology is that it requires only a single receiver to obtain the angles of arrival, providing significant reduction in system cost.
(ii) Another approach to direction finding is based on the so-called Multiple Signal Classification (MUSIC) algorithm. This approach requires a more densely populated antenna array than the conventional technique described above, with a receiver behind each element. The signals received by all the elements are processed to determine the angles of arrival (see "Multiple Emitter location and Parameter Estimation", R. O. Schmidt, *IEEE Trans. Ant. Prop.*, vol. AP-34, No. 3, March 1986). The technology disclosed herein offers significant cost advantage since only one or two receivers are utilized, rather than requiring that a separate receiver be associated with each element.

Prior art coded aperture beamforming technology includes:
(i) U.S. Pat. No. 5,940,029 describes obtaining radar data by sequentially switching between transmit and/or receive elements. This is closely related to a Synthetic Aperture Radar (SAR). This approach differs from the present technology because it requires a complex matrix of RF switches that is costly to implement; it only requires a set of N single bit modulators inserted between the antenna elements and the summation network in a receiving application.
(ii) U.S. Pat. No. 7,224,314 describes a reflectarray with each antenna element containing switching devices that vary the reflection impedances of the elements. By setting the switching devices to particular values one obtains a reasonably well focused beam when the reflectarray is illuminated by a source. Changing the switching devices allows one to steer the reflected beam. The present technology is different in that the different modulator states are changed sequentially, each providing a wide angle, low gain (i.e., unfocused) beam. For example, if the modulators are single bit (i.e., two state) phase shifters, such as 0/180 deg phase shifters, all of the N modules (for an N element array) are all changed to a particular set of states, with a different set of states for each measurement. The modulator states are chosen to provide wide angle, low gain beams to cover the entire field of view. Effective high gain beams (i.e., focused beams) are then obtained in signal processing after the data is gathered.
(iii) U.S. Pat. No. 6,266,010 describes an antenna array divided into four quadrants, with the output of each quadrant modulated by a 0/180 degree phase shifter. By setting the phase shifters in various states one may obtain antenna patters similar to those produced by a monopulse array. There is apparently no disclosure of sequentially collecting data and then obtaining bearing angles through digital manipulation of the data. The technology disclosed herein utilizes modulators behind each antenna element (not each quadrant) and, unlike this prior art, does not form the desired physical beams but forms beams synthetically after the data is collected.

It is believed that no one has previously proposed RF digital beamforming by coding an antenna array aperture with single bit modulators. Conventional phased array antennas place multi-bit phase shifters behind each element to form sharp transmit or receive beam patterns for a single measurement through constructive and destructive interference of the element fields. On the other hand, the technology disclosed herein uses only single bit modulators (e.g., phase shifters) that do not form sharp beam patterns (i.e., "pencil beams") during a single measurement. Effective sharp beam patterns are produced digitally after data collection using digital signal processing. An important characteristic of the present approach, and one that distinguishes it from conventional phased arrays, as that the codes (phase shifter states) are selected so that the resulting beam patterns fill the desired field of view more or less uniformly, without any directive ("pencil") beams. Under these conditions, adding additional bits (beyond one bit) will not improve radar performance since single bit phase shifter control is sufficient to obtain a linearly independent set of measurements that may be "inverted" to estimate the antenna element signals and then processing these signals to produce digitally formed beams. A conventional phased array radar may be operated in this single-bit mode to obtain range, velocity, and bearing angle information in an acquisition period reduced by approximately a factor of N, where N is the number of beams within the field of view. This is possible because Code Aperture Radar (CAR) disclosed herein acquires information from all scatterers within the field of view from a single radar acquisition period (i.e., a single set of frequency sweeps of sufficient extent and duration to produce the desired range and velocity resolutions). In contrast, a conventional phased array must dwell for that same acquisition period (for the same velocity resolution) for each beam location, sequentially stepping through all N beam locations and therefore taking N times as long. The advantage of operating a conventional phased array radar in this mode is that information may be collected very quickly over the field of view and for any objects of interest the array may then be operated with multiple phase shifter bits to direct a beam at the object and improve the radar sensitivity.

An advantage of this technology is a significant simplification of the antenna array, resulting in reduction in cost and power dissipation, while still providing estimates of range, velocity, and bearing, and obtaining these estimates in a fraction of the time required by a conventional phased array to cover a wide field of view. Conventional phased array radar antennas contain substantial microwave electronics (e.g., multi-bit phase shifters and variable gain amplifiers) at each antenna element, resulting in very high cost and high power dissipation. Furthermore, a conventional phased array must obtain range and Doppler estimates for each beam position sequentially, resulting in a long acquisition time for high gain beams covering a wide field of view. The present technology acquires range, Doppler, and bearing estimates within the same time period as a single beam position of a conventional phased array radar, substantially reducing the total acquisition time.

Another advantage of this technology in a radar implementation is that transmitted RF energy is not required to be focused into a high gain beam, but instead may be radiated over a wide field of view. This produces a radar signal with a low probability of interception by electronic sensors.

Additionally, this technology provides the advantage of software reconfigurability since the beams are formed by digital computation (i.e., synthetically). By changing the parameters of the signal processing algorithm, beams pointing in any direction (within the field of view) with any beamwidth (within the limits set by diffraction) may be obtained from the same set of hardware.

BRIEF DESCRIPTION OF THIS TECHNOLOGY

The disclosed coded aperture beam technique uses an array of antennas to receive signals over a prescribed field of view (for example, an upper hemisphere field of view) and over a prescribed frequency band, and applies a temporal modulation code to the signals. The coded signals are then summed together to form a single coded waveform that may be processed (e.g., amplified, downconverted, demodulated, etc.) by a single receiver and digitized by an A/D converter. Through appropriate digital processing the codes may be effectively inverted to determine the direction of arrival of the incident signals. An important feature of this technology lies in the use of very simple single bit modulators (e.g., 0/180 deg phase shifters) to code the signals received at each antenna element before they are summed together and processed by a receiver.

This document teaches how to implement a radar system to obtain estimates of range, velocity, and bearing angles for a collection of scattering objects using a single radar transceiver and an antenna array that contains only binary (two state) modulators (amplitude, phase, etc). Unlike conventional phased array radars, the antenna element phase modulation in the present technology is not used to produce a high gain beam in a particular direction, but instead used to code the element signals in a desired manner. Following reception, signal processing that utilizes the antenna element modulation codes is used to extract range, radial velocity, and bearing angle information (namely, the direction in which the scattering object is located).

In one aspect the present technology provides an apparatus for determining a direction of arrival of at least one RF signal from at least one source of the at least one RF signal reflected from an object, the apparatus comprising: a receiving antenna and a transmitting antenna, at least one of the receiving antenna and the transmitting antenna comprising an array of antenna elements for transmitting or receiving the at least one RF signal and at least one array of single bit modulators, each single bit modulator in said at least one array of single bit modulators being coupled with a corresponding antenna element in said array of antenna elements for modulating signals for or from the corresponding antenna elements according to a sequence of supplied multibit codes, the multibit codes each having two states with preferably approximately a 50% probability for either of the two states occurring in each given multibit code in said sequence of said multibit codes. Preferably, the transmitted and/or received energy is 0/180 degree phase encoded with respect to each element in the array of antenna elements by a corresponding single bit modulator in the at least one array of single bit modulators according to the sequence of multibit codes supplied to the at least one array of single bit modulators.

In another aspect the present technology provides a method for determining the range, radial velocity, and bearing angles of scattering objects reflecting scattered signals, the method comprising: utilizing an array of antenna elements, the array of antenna elements each having an associated two state modulator, coding transmitted and/or received energy according to a sequence of multibit codes, the multibit codes each having two states with approximately a 50% probability for each of the two states occurring in each given multibit code in said sequence of multibit codes, thereby allowing the determination of range, radial velocity, and bearing angles through digital computation after the scattered signals have been received.

In still yet another aspect the present technology provides an apparatus for determining a direction of arrival of at least at least one RF signal from at least one source of the at least one RF signal, the apparatus comprising: an array of antenna elements for receiving the at least one RF signal; an array of single bit modulators, each single bit modulator in said array of single bit modulators being coupled with a corresponding antenna element in said array of antenna elements for modulating signals from the corresponding antenna elements according to a multibit code; a mixer; a summation network for applying a summation of signals from the array of single bit modulators to said mixer, the mixer converting the summation of signals either to baseband or to intermediate frequency analog signals; an analog to digital converter for detecting and converting the baseband or intermediate frequency analog signals from the mixer to corresponding digital signals; and means for analyzing the corresponding digital signals to determine the direction of arrival of the at least at least one RF signal from the at least one emitting source of the at least one RF signal.

An important characteristic of the present technology, and one that distinguishes it from conventional phased arrays, as that the codes (phase shifter states) are selected so that the resulting beam patterns fill the desired field of view more or less uniformly, without any directive beams. Under these conditions, adding additional bits (beyond one bit in the modulators) does not improve radar performance since single bit phase shifter control is sufficient to obtain a linearly independent set of measurements that may be "inverted" to estimate the antenna element signals and then processing these signals to produce digitally formed beams. A conventional phased array radar may be operated in this single-bit mode to obtain range, velocity, and bearing angle information in an acquisition period reduced by approximately a factor of N, where N is the number of beams within the field of view. This is possible because CAR acquires information from all scatterers within the field of view from a single radar acquisition period (i.e., a single set of frequency sweeps of sufficient extent and duration to produce the desired range and velocity resolutions). In contrast, a conventional phased array must dwell for that same acquisition period (for the same velocity resolution) for each beam location, sequentially stepping through all N beam locations and therefore taking N times as long. The advantage of operating a conventional phased array radar in this mode is that information may be collected very quickly over the field of view and for any objects of interest the array may then be operated with multiple phase shifter bits to direct a beam at the object and improve the radar sensitivity.

DETAILED DESCRIPTION

The coded aperture beam forming techniques disclosed herein may be used in a number of applications, including radio direction finding and radar, where a repetitive signal occurs. An embodiment of radio direction find using aperture beam forming techniques is first described and later several embodiments of radar using aperture beam forming techniques are described thereafter.

A "repetitive" signal f(t) is periodic in time and therefore satisfies f(t)=f(t+T), where T is the repetition period. Although this definition strictly applies only to signals of infinite duration (which do not occur in practice), the term "repetitive" is commonly used to describe signals where this condition applies over a finite period of time, but of significant duration for the system at hand. Repetitive signals may include pulsed radar waveforms, the carrier of many communication signals (e.g., AM and/ or FM radio), and synchronizing signals transmitted by communication systems, all of which exhibit a repetition rate of pulses or signals. The sine wave carrier of an AM signal has a frequency which can be viewed as a signal of pulse repetition rate. In the context of this technology, the repetitive signal can be a carrier which repeats due to its frequency or the repetitive signal can be modulation on a carrier, for example, which repeats. An unmodulated carrier (as well as the carrier extracted from a modulated signal) has a frequency and hence a repetition rate of pulses or signals.

The embodiments described below for radio direction finding and radar include certain similarities and therefore common reference numerals are frequently used to refer to elements which have common or similar functions across the described embodiments.

Coded Aperture Beamforming

Figure 1:
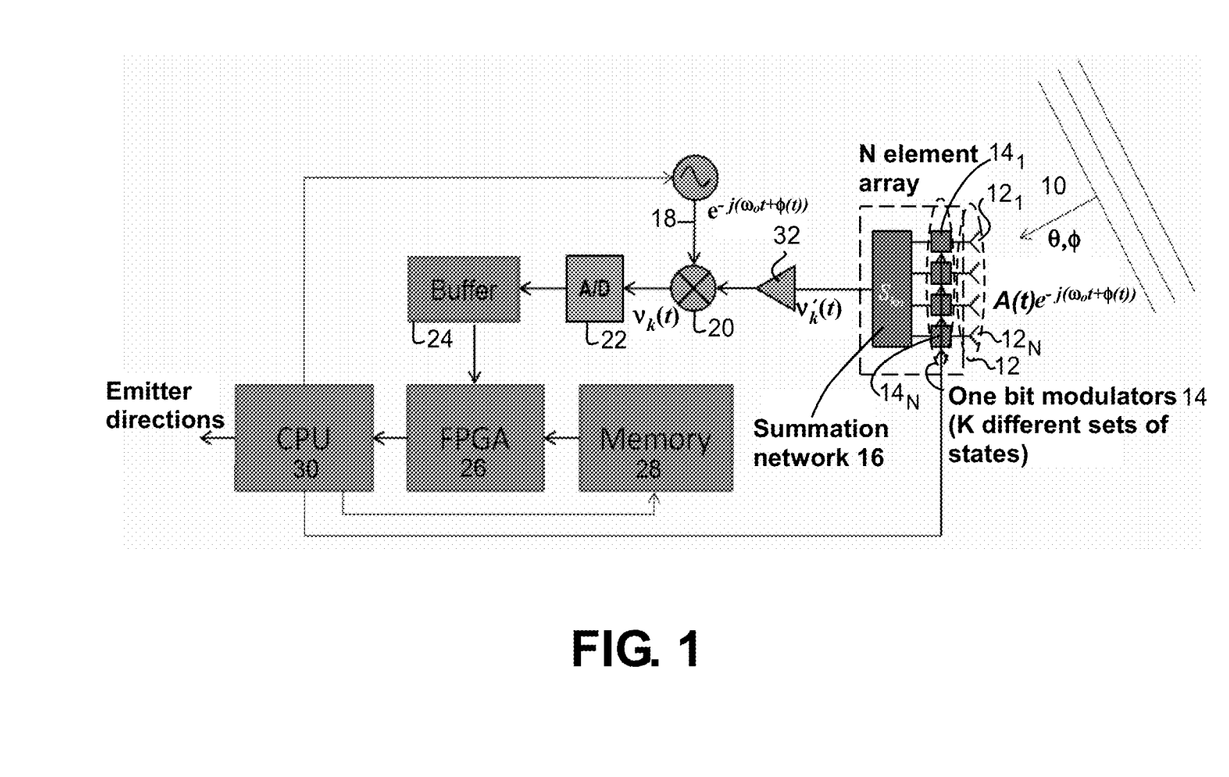
FIG. 1 is a block diagram of the disclosed coded aperture beam detecting technique used in a receiver application.

FIG. 1 shows a block diagram implementation of a direction finding apparatus and method using coded aperture beam forming. Signals 10 are received by an N element antenna array 12 (which, in practice, is preferably a two dimensional array, but a one dimensional array is more convenient for analysis and simulation and may be used in practice). The signal collected by each element $12_1 \ldots 12_N$ is modulated by a corresponding single bit modulator $14_1 \ldots 14_N$. A preferred embodiment of modulators 141 ... 14N is a two state phase shifter (e.g., 0 or 180 degrees), but modulators $14_1 \ldots 14_N$ could modulate amplitude or the antenna signal gain pattern instead. A desirable feature of this technology is that the single bit modulators $14_1 \ldots 14_N$ are inexpensive to implement in an array. There are many ways to implement a single bit modulator using methods known to those skilled in the art. It is possible to use a phase shifter capable of more than two phase states (i.e., phase shifter having more than one bit). The techniques described below work equally well with phase shifters with more than two states, but there is no improvement in performance to be gained by increasing the number of phase shifter states. Thus in the preferred embodiment the phase shifters only have two states. But this code aperature scheme may be applied to pre-existing hardware which has multi-bit phase shifters. And if that is done, those multi-bit phase shifters need only be operated as one bit phase shifters and enjoy the benefits of this technology.

Signals 10 from a remote source are collected during a time period T during which the modulators $14_1 \ldots 14_N$ are set to a particular set of states, forming an N-bit aperture code. The aperture codes comprise K different codes, with one code (preferably comprising N bits) being applied to modulators $14_1 \ldots 14_N$ during each signal reception (code) interval. For an incident waveform from a single emitting external source, the signal collected by an $n^{th}$ antenna element 12 has the form:

$$s_n(t)=A(t)e^{-j(\omega_n t+\phi(t))}\tilde{e}_n(\theta,\phi)$$

The signal amplitude A(t) of the incident signal 10 is expressed as a function of time to include amplitude modulation, as is commonly used in pulsed radar for example. The phase function φ(t) represents the phase (or, equivalently, frequency) modulation of the incident signal 10. The function $\tilde{e}_n(\theta,\phi)$ is proportional to the far zone radiated E field for the $n^{th}$ antenna element, normalized so that $4\pi|\tilde{e}_n(\theta,\phi)|^2 = G_n(\theta,\phi)$ is the gain of the $n^{th}$ element. When multiple signals are present, it becomes a summation of the individual signals, all multiplied by the common function $\tilde{e}_n(\theta,\phi)$. For simplicity of explanation it shall be assumed that only one signal is present. Preferably, the number of bits (N) in the code is equal to the number of modulators $14_1 \ldots 14_N$, but the number of bits in the code could be different, in which case some bits would either be ignored or repeated, as needed.

There are many ways that one may choose the phase shifter states for each code period of the modulators $14_1 \ldots 14_N$. If the modulators are 0/180 degree phase shifters one may represent the two possible phase shifter states of each modulator $14_1 \ldots 14_N$ as a positive one and a negative one (or as a single bit binary number). One method of choosing the states is to use a pseudorandom number generator to produce N random states (as N bit binary codes with each bit being either a positive one or a negative one) for the N antenna elements $12_1 \ldots 12_N$, with preferably (but not necessarily) a 50% probability for either of the two states. One might utilize K such collections of N bit random numbers from the set of codes, and these values may be collected in a "coding matrix" $S_{k,n}$ with each row representing the N phase shifter values for a corresponding sweep. Another method is to utilize the well know Hadamard matrices to form the codes. One may form a KxK Hadamard matrix using techniques that are well known to those skilled in the art, and then truncate the matrix by removing K minus N columns to form the matrix $S_{k,n}$. This procedure produces a coding matrix S that has orthogonal columns, a quality that may be utilized to improve performance or computational throughput, and that minimizes the effects of numerical roundoff errors due to the optimal conditioning of the coding matrix. However, the codes are preferably chosen such they should result in antenna signal gain patterns (for each k) that extend as uniformly as reasonably possible over the field of view of interest. A set of N code values that produce an antenna signal gain pattern with a preferential direction should normally be discarded. For example, one would not want to utilize the Hadamard matrix column that consists of all ones or negative ones since these would produce a high gain broadside antenna pattern (assuming the feed or combining networks are designed with constant input/output phase for all ports). For this reason one would typically design the antenna array so that each array element has a different, and preferably pseudorandom, phase delay with respect to the common power combiner output power reference plane. This prevents well-defined beams being formed even when the phase states are all set to a common value (such as +1). Another important consideration when choosing the codes is linear independence of the fields corresponding to the codes. For example, if two codes produce linearly dependent fields, such as fields that differ only by a multiplicative complex constant, the two codes provide essentially redundant information. Such a situation reduces the performance of the Coded Aperture scheme disclosed herein and may introduce numerical instabilities. To avoid such a situation, the codes are preferably chosen so that the nonzero singular values of a Singular Value Decomposition (SVD) of the coding matrix be as large as possible. Note that an orthogonal code set maximizes the nonzero singular values, guaranteeing linear independence and an optimally conditioned coding matrix. There are many other methods one may use to choose the set of codes and each will result in slightly different Coded Aperture performance.

During each signal reception (code) interval, the element signals are summed together using a summation network 16, producing an RF signal proportional to $$v'_k(t) = V(t+kT)e^{-j(\omega_o(t+kT)+\phi(t+kT))}\sum_n S_{kn}\vec{e}_n(\theta, \phi)$$

where $S_{kn}$ is the complex transfer function for the signal propagating from the $n^{th}$ antenna element to the summation network output for the $k^{th}$ modulator code. The subscript k is used to denote the $k^{th}$ code interval, with time 0<t<T running over a single code interval and the code index running over k=0,1, ..., K−1, after which the code periods repeat. Note that the implementation of summation network 16 is well known to those skilled in the art. For example, a Wilkinson power combiner can be utilized for the summation network 16. The RF signal $v'_k(t)$ output form the summation network 16 is a linear combination of the antenna element signals, each modulated by a particular (known) modulation value. The set of N modulators $14_1 \ldots 14_N$ are set to different values for each of K successive time intervals.

In order to coherently combine signals over multiple code periods the signals should be downconverted, to translate the RF signal $v'_k(t)$ from the summation network 16 down to baseband (for example), and demodulated to remove the phase modulation. Mathematically, downconversion and demodulation are accomplished by multiplying the signal by a continuous wave (CW) signal 18 with conjugate phase dependence. Note that this requires the knowledge of the RF frequency and phase modulation of signal 10, parameters that are commonly extracted by receivers designed for signal identification. In practice downconversion and demodulation are typically implemented using a mixer 20 whose LO is the phase modulated CW signal 18 from the VCO, as indicated in FIG. 1. If desired, demodulation can be accomplished in the digital domain following downconversion and digitization. Referring to FIG. 1, the output voltage of the mixer 20 is $$v_k(t) = G_{rec}V(t+kT)\sum_n S_{kn}\vec{e}_n(\theta, \phi)$$

where $G_{rec}$ is the total voltage gain from the output of the summation network 16 to the input of A/D converter 22.

The voltage output by mixer 20 is then digitized by an A/D converter 22 and the values for the different codes are stored in a buffer 24 so that subsequent processing may be desirably accomplished in the digital domain. For many signals of interest the signal amplitude is either independent of time, so that V(t+kT)=V=constant, or consists of a number of constant amplitude pulses. In either case, time dependence may be removed by averaging over a code period:

$$V = \frac{1}{Q}\sum_q V(t_q),$$

where $t_q=q\Delta t$ is the discrete time variable and $T=Q\Delta t$. The A/D converter 22 digitizes time with a time period $\Delta t$ and T is the code period. Note that we assume that the code duration T (which is the duration of a single code) is longer than the pulse repetition period so that approximately the same number of pulses are contained within each code period. If desired, one may synchronize the coding to the pulse rate so that the code period is equal to an integral number of pulse repetition intervals.

This technology is used with repetitive (i.e., periodic) signals or with constant signals (such as carrier signals).

While some signals may be non-repetitive insofar as their modulation, once the signal is demodulated, the result is repetitive (or constant).

After integrating out time, and scaling the mixer voltage to unity for simplicity of analysis, the mixer 20 output values may be expressed in matrix form as $$v=S\tilde{e}(\theta,\phi)$$

where s is a complex K×N "code" matrix, and $\tilde{e}(\theta,\phi)$ is a complex N element vector. To obtain directional information, invert the code matrix through the matrix multiplication:

$$x=(S^HS)^{-1}S^Hv=\tilde{e}(\theta,\phi)$$

where the superscript H denotes Hermitian conjugate. Note that the matrix $(S^HS)^{-1}S^H$ depends only on the hardware implementation and the chosen set of codes and therefore may be computed once and stored in a memory 28. In practice, the total number K of sets (words) of modulation codes is preferably greater than or equal to the number of antenna elements N thereby providing a least mean squared error fit to the collected data. To test for an emitter of signal 10 in a specific direction $\theta',\phi'$, multiply by the conjugate of the antenna E field functions and add the results:

$$y=\tilde{e}^H(\theta',\phi')(S^HS)^{-1}S^Hv=\tilde{e}^H(\theta',\phi')\tilde{e}(\theta,\phi)$$

The direction of the emitter of signal 10 is obtained by determining the direction $\theta',\phi'$ that maximizes y, which occurs for $\theta',\phi'=\theta,\phi$. The estimate obtained above gives the equivalent of a uniform aperture distribution. If desired, one may control the sidelobes by tapering the aperture with a function $a_n$. In this case the parameter y is given by $y=\tilde{e}^HA^H(S^HS)^{-1}S^Hv$, where A is a diagonal matrix whose elements are $a_n$. The elements of the vector $\tilde{e}(\theta',\phi')$ depend only on the antenna hardware and the emitter direction that one would like to test for. In practice, a prescribed field of view would preferably be divided up into a set of discrete directions $\theta_i',\phi_j'$ and the values of $\tilde{e}(\theta_i',\phi_j')$ would preferably also be stored in memory 28. The matrix multiplication may then be efficiently computed using a Field Programmable Gate Array (FPGA) 26 or some other type of digital signal processor to provide the emitter strength estimates in the directions $\theta_i',\phi_j'$. A CPU 30 may then be used to determine which directions have local peaks that exceed some threshold and indicate the corresponding directions as a system output.

Figure 2:
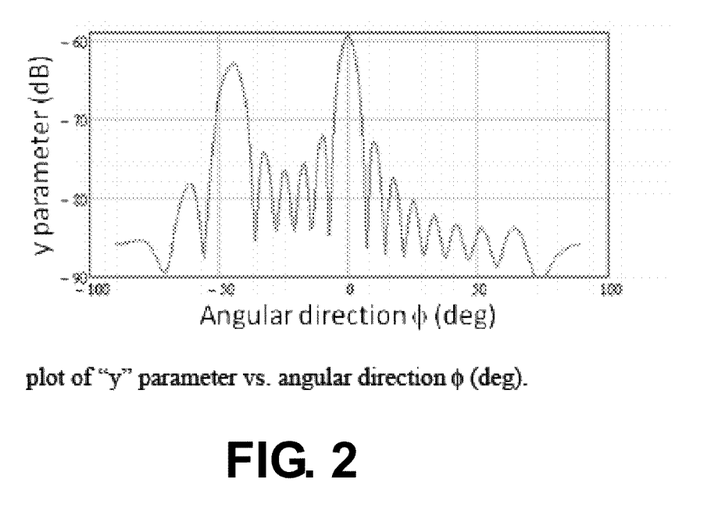
FIG. 2 is a plot of the "y" parameter vs. angular direction φ (deg).

FIG. 2 shows the results of a simulation of two emitters of equal strength located in the x-y plane of a coordinate system, equidistant from the direction finding system that is located at the origin. The receiver antenna array 12 consists of sixteen z-directed half wavelength dipoles spaced a half wavelength apart along the y-axis in this simulation. One of the emitters is located along $\phi=0$ (x-axis) and the other along $\phi=-45°$. The simulator assumes both emitters are transmitting a CW signal at the same frequency. Each antenna element 12 is coupled to a one bit (0/180 deg) ideal phase shifter 14 and outputs thereof are all summed with a network of ideal Wilkinson combiners defining the summation network 16. For each code period, the phase shifter 14 values were chosen randomly with 50% probability for the state of each phase shifter $14_1 \ldots 14_N$. FIG. 2 shows a plot of the magnitude of the computed parameter y in dBs vs. incident angle $\phi'$. One can clearly see the well defined peaks of intensity for the values of $\phi'$ equal to the incident angles of the emitters.

The antenna elements 12 were assumed to have a half wave spacing as that is convenient for analysis done for the simulation, but, in practice, ½ to 1 wavelength is a typical spacing between individual antenna elements 12. And the spacing between antenna elements 12 need not be uniform, as it can be randomized if desired.

To summarize, the signal from each antenna array element $12_1 \ldots 12_N$ is modulated by an associated one bit modulator $14_1 \ldots 14_N$ (which are preferably implemented as one bit phase shifters) by a modulator code then summed to a single output signal $v'_k(t)$. The signals are then downconverted and demodulated preferably to baseband and then digitized. An inversion of the modulator code produces the antenna element signal which may then be appropriately amplitude and phase weighted to provide a scalar that indicates how much energy is arriving from a given direction. The direction of the signal emitter 10 is given by the direction that maximizes that scalar value.

Radar Applications Using a Phase Coded Aperture Beam

The coded aperture beam forming techniques disclosed herein may be used in a radar embodiment with a variety of radar types (e.g., pulse Doppler, frequency modulated continuous wave (FMCW), synthetic aperture radar (SAR), etc.), radar waveforms (e.g., frequency chirp, stepped frequency, phase coded, etc.), and furthermore may be used either on transmit or receive or both. For the sake of explanation of this radar embodiment, assume that an FMCW radar is utilized which produces a series of linear frequency chirps with aperture coding on both transmit (T) and receive (R). This type of radar would be effective, for example, for an automotive radar application. The same element numbers are used for this embodiment as for the direction finding embodiment (where appropriate or convenient to do so), but a suffix T or R is sometimes added where similar elements are used for transmit T or receive R since radar has both receive and transmit capabilities. Aperture coding on both transmit and receive is not necessary. One may perform aperture coding on either transmit or receive alone, if desired.

Figure 3:
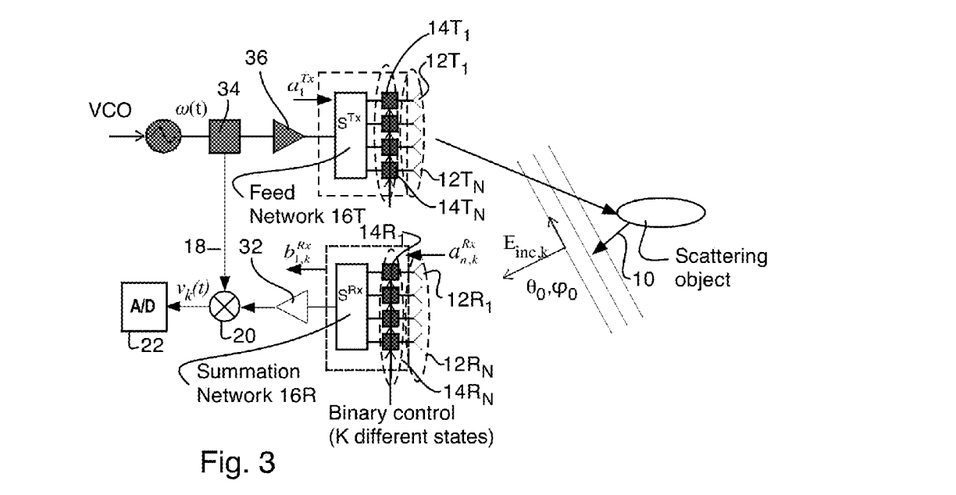
FIG. 3 is a block diagram of a FMCW radar with each antenna element modulated by a two-state phase modulator.
Figure 4:
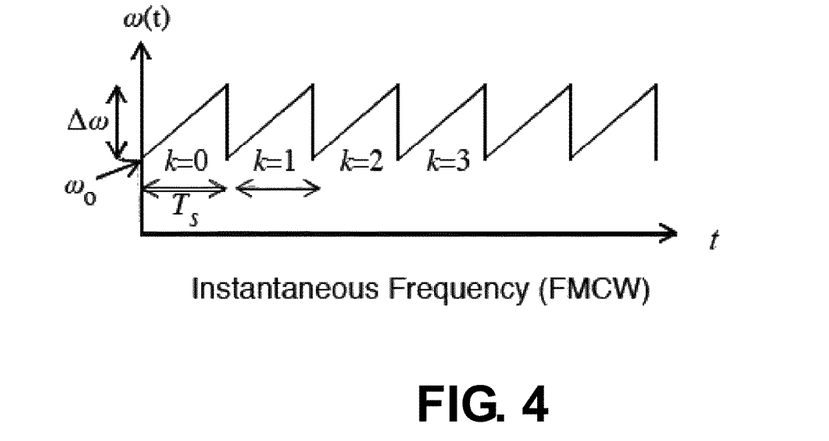
FIG. 4 is a graph showing the instantaneous frequency transmitted by the radar of FIG. 1.

Similar to the direction finding embodiment, each of the transmit antenna elements 12T and receive antenna elements 12R in this Code Aperture Radar (CAR) have an associated 0/180 degree (i.e., preferably a single bit modulator) phase shifter 14T or 14R. FIG. 3 shows a block diagram of such a radar architecture. FIG. 4 shows the instantaneous frequency transmitted by the radar. The instantaneous radian frequency for each sweep is given by $$\omega(t)=\omega_o+\frac{\Delta\omega}{T_s}t, -\frac{T_s}{2}<t<\frac{T_s}{2}$$

and is related to the frequency in Hz as $\omega=2\pi f$. For each of the successive frequency sweeps, labeled "k," the transmitting and receiving element phase shifters are set to different values, for a total of K states (one set of states for each sweep). As is well known from basic radar theory, the radial velocity resolution $\Delta v$ is determined by the total observation time $KT_s$: $\Delta v=c/2f_oKT_s$ where c is the speed of light and $f_o$ is the center frequency in Hz. The range resolution $\Delta r$ is determined by the RF bandwidth in Hz according to $\Delta r=c/2\Delta f$.

In general, the antenna elements 12T and 12R are preferably disposed a two dimensional array (but only a single dimensional array is depicted of ease of illustration), possibly conformal to some surface, with N elements in each array $12T_1 \ldots 12T_N$, $12R_1 \ldots 12_N$ spaced between approximately one half to one wavelength apart. The same elements in one array may be used for both receive and transmit using a circulator for example.

Referring to FIG. 3, the feed network 16T and the summation network 16R are each associated with the binary modulators 14T and 14R at each antenna element 12T and 12R that modulate the signal at each antenna element. The feed network 16T divides the transmit energy while the summation network 16R combines the received energy as described with reference to the direction finding embodiment of FIG. 1. As in direction finding embodiment, the modulators 14R are preferably implemented by one bit phase shifters that provide either 0 or 180 degrees of phase shift as a function of the state of the particular bit of the code which they receive during a code interval. As explained above, it is possible to implement this disclosed concept using phase shifters with more than two states, but the preferred embodiment utilizes single bit phase shifters since these have the lowest cost. During each code interval k, the individual modulators 14T and 14R are set to particular states, with each set of states being different for each code interval. Thus, for each code interval the transmit and receive arrays provide particular transmit and receive field patterns that may be predicted using standard methods of antenna theory.

The choice to implement coded aperture on transit (Tx) or receive (Rx) or both depends on the requirements for the given application. Even though the cost of the antenna array and one bit phase shifters 14 is lower than that of a conventional phased array, it is not zero, so if the application does not require aperture coding on both Tx and Rx, then aperture coding may be implemented on only one or the other. Generally speaking, the same performance may be obtained by implementing coded aperture on either Tx or Rx. But, other considerations, for example power handling capability of the single bit phase shifters, may motivate the implementation of coded aperture on Rx (for this power handling capability issue). If aperture coding is implemented only on Tx or Rx, the effective antenna pattern resulting from aperture coding produces the gain pattern of only a single antenna. If the coded antenna array has N=12, then one should utilize at least N codes to achieve performance similar to a conventional phased array. If one desires the high gain and low sidelobe performance of a two antenna system, then one should implement coded aperture on both Tx and Rx. In this case, if the Tx and Rx arrays each have N elements, then one should preferably utilize at least $N^2$ codes to achieve performance similar to a conventional phased array. Generally it is desirable to choose different sets of codes for Tx and Rx rather than use the same codes for Tx and Rx since the former gives slightly better performance over the latter.

FIG. 4 shows one code interval per sweep, but it is important to note that one may implement this Coded Aperture Radar (CAR) technique with many codes per sweep period $T_s$ if desired.

As with conventional radar, transmitted energy from elements 12T is scattered off of object(s) in the vicinity of the radar and is collected by the receive array 12R. For a FMCW homodyne radar, for example, the received signal is typically amplified and demodulated by an I-Q mixer 20 whose LO 18 is a replica of the transmitted signal (provided by signal divider 32 in FIG. 3). Because the signals from multiple scattering objects combine linearly, we may consider only a single object for simplicity. As is well known by those skilled in the art, for a single scattering object at range r and radial velocity v, and whose range is sufficiently short so that the time delay of light traveling to and from the object is small relative to the modulation period of the transmitted signal, the mixer output voltage for the $k^{th}$ sweep may be expressed in the form $$v_k(t) = V_o e^{-j\frac{2\omega(t)(r+v(t+kT_s))}{c}} g_k^{Tx}(\theta,\phi) g_k^{Rx}(\theta,\phi). \quad \text{(Eqn. 1)}$$

$V_o$ is the voltage amplitude of the signal, which depends on parameters such as Tx power, object radar cross section, range (i.e., diffraction path loss), mixer conversion loss, and Low Noise Amplifier (LNA) 32 gain (the equations present here assume one code per sweep, consistent with FIG. 4). The function $g_k^{Tx}(\theta,\phi)$ is proportional to the complex radiated E field of the antenna array for the $k^{th}$ code when excited at the input to the Tx feed network 16T, normalized so that $G_k^{Tx}(\theta\phi)=|g_k^{Tx}(\theta,\phi)|^2$ is the gain of the Tx array for the $k^{th}$ code. Similarly, $g_k^{Rx}(\theta,\phi)$ is proportional to the complex E field pattern for the antenna array for the $k^{th}$ code when excited at the output of the Rx feed network, normalized so that $G_k^{Rx}(\theta,\phi)=|e_k^{Rx}(\theta,\phi)|^2$ is the gain of the Rx array for the $k^{th}$ code. The set of K signals obtained from K successive sweeps is then digitized by A/D convertor 22 and stored for digital computation as described with reference to the direction finding embodiment. Note that this embodiment may be easily modified (or simply utilized) to provide for the cases of coding on Tx or Rx only by setting the other (uncoded) antenna modulation to be independent of the code index k. The above description assumes that during each sweep energy is transmitted and received with a fixed code, and this code is changed from sweep to sweep. It is possible, and sometime desirable, to step the frequency across the RF bandwidth, holding the frequency constant at each step, and using a different code during each constant frequency interval. For a given number of sweeps more codes will be employed, which improves the characteristics of the radar ambiguity function as functions of velocity and bearing angle and therefore improves performance. The disadvantage of changing codes at each frequency step is that the ambiguity as a function range is degraded. Depending on the application at hand one may choose one coding scheme or another to optimize particular aspects of the radar performance.

It should be noted that this technique also works for non-FMCW radars as well, such as pulse Doppler radar.

In practice, one may apply the disclosed CAR technique in situations where the total time delay to and from certain targets within the range of interest is not short relative to the modulation period of the transmitted signal. In this case, when coding is done on the transmit aperture, the received signals are time delayed versions of the coded transmit signals. In order to estimate the range, velocity, and bearing angles one must use correlation techniques where the received signals are correlated against delayed replicas of the transmitted signals. These time delay correlation techniques are well known to those skilled in the art.

The digitized signals are then manipulated to form estimates of the range, velocity, and bearing angles of the scattering objects using the "matched filter" approach which is well known to those skilled in the art. The matched filter is a standard approach used to estimate some parameter from a measurement. A good reference is M. I. Skolnik, "Introduction to radar systems (third edition)," McGraw-Hill, N.Y., 2001, Section 5.2, p. 276. For example, given a received signal from a series of sweeps/codes, we wish to estimate the radar cross section of an object at a particular range, radial velocity, and bearing angles. We multiply the received signal by the complex conjugate of the signal produced by an object scattering a radar signal at the desired range, velocity, and bearing angles (we know what signal this would produce). If there is an object there, the result will be a sizeable output, proportional to the RCS of the object. Objects at other ranges, etc., will tend to produce very small filter outputs. First, the stored signal (from Eqn. 1) is multiplied by a "reference" signal which is the complex conjugate of the signal produced by an object at range r' and radial velocity v', and the results are integrated over time (or, equivalently, summed in the digital domain) to determine how much scattered energy exists at that particular range and velocity. Mathematically, this is expressed as $$x_k(r', v') = \frac{1}{T_s} \int_{-\frac{1}{2}T_s}^{\frac{1}{2}T_s} v_k(t) e^{j\frac{2\omega(t)(r' + v'(t+kT_s))}{c}} dt \quad \text{(Eqn. 2)}$$

The bearing information is computed in a similar manner. The computed values $x_k(r',v')$ are multiplied by the conjugate of the coded signals produced by an object at particular bearing angles $\theta',\phi'$ and the result is summed over the code index k. Mathematically this produces a set of values $$y(r', v', \theta', \phi') = \sum_{k=0}^{K-1} x_k(r', v')(g_k^{Tx}(\theta', \phi')g_k^{Rx}(\theta', \phi'))^* \quad \text{(Eqn. 3)}$$

where the asterisk denotes complex conjugate. By testing the signal $v_k(t)$ against all desired values of range (r'), radial velocity (v'), and bearing angles ($\theta',\phi'$), the quantity y indicates the strength of the scattering (if any) for those particular values. One skilled in the art will also appreciate that one may control the spatial sidelobe levels through effective aperture weighting by multiplying $x_k(r', v')$ by an aperture weighting function $w_k$ prior to executing the computations in Eqn 3.

Figure 5:
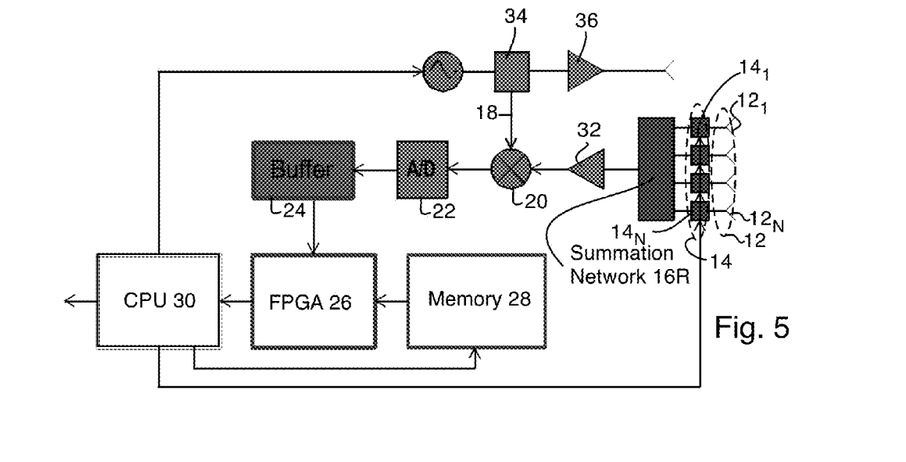
FIG. 5 is a block diagram a possible hardware implementation of a coded aperture radar signal processor.

It should be appreciated that there are many ways to implement these signal processing computations. The reference functions in Eqn. 2 and Eqn. 3 are fixed for a given array geometry and may be stored in memory to speed computation. The operations involve multiplications and additions and are therefore amenable to implementation in a Field Programmable Gate Array (FPGA) 26, for example, in a hardware arrangement indicated by the block diagram in FIG. 5. The signals from the mixer 20 are digitized by A/D convertor 22 and stored in buffer 24. The signals are tested against the set of reference signals stored in memory with the calculations efficiently performed by an FPGA 26. The output of the FPGA 26 is a set of scattering amplitudes that are sent to a CPU 30 for higher level processing and system output.

An important assumption of Eqn. 1 is that the bearing direction to the object is constant over the total acquisition time. In real systems objects will typically be in motion relative to the radar antenna elements 12R and this motion will often cause the bearing angles to change over time. One can show mathematically that the approach as described above is effective when the change in bearing angle over the total acquisition time $KT_s$ is small relative to the spatial beamwidth of the radar. Those skilled in the art will recognize that one may easily modify the matched filter approach described here to also obtain estimates of the time rate of change of bearing angles.

There are many choices of modulator state configurations (i.e., codes) that provide good performance and high selectivity of velocity and bearing angles. In general, the number of codes K utilized should be greater than or equal to the number N of antenna elements 12. One may show mathematically that the selectivity performance of the radar improves proportionally to the number of codes K. In order to achieve high selectivity of radial velocity one can show mathematically that it is advantageous to utilize a set of codes that result in antenna gains $G_k^{Rx}(\theta,\phi)$ and $G_k^{Tx}(\theta,\phi)$ that are as constant as possible both over the desired field of view and over all the codes. Note that nearly constant gain functions indicate that the change in modulator states primarily alters the phases of the antenna array field properties. One skilled in the art will recognize that one cannot achieve constant gain over a wide field of view while simultaneously radiating from multiple elements because constructive and destructive interference between elements causes unavoidable peaks and nulls in the antenna gain. However, it is sufficient to select a set of modulator states (a set of size K of N-bit modulator codes) so that the resulting gain patterns are broadly distributed over the desired field of view and are approximately constant when all codes are averaged together. One such choice of modulator states that achieves this is obtained by selecting the binary modulator values at random with 50% probability for each state. One can show mathematically that this choice of codes produces the desired properties when the number of codes is sufficiently large (e.g., greater than 100). One may also use well known codes such as the columns of the Hadamard matrices, as long as one avoids codes that produce preferential beams in a single direction (such as the column of the Hadamard matrix that contains identical values).

A person skilled in the art will recognize that the CAR technique presented here may be applied in a variety of ways to various types of radar systems (in addition to the direction finding systems as previously described with reference to FIG. 1). In addition to being used with FMCW and pulse-doppler signal waveforms, this coded aperture technique may also be used in conjunction with synthetic aperture radar (SAR). This well known technique utilizes a moving radar platform to obtain data over a large area and then processing the data to obtain high resolution along the direction of travel by effectively extending the antenna aperture. SAR can benefit from coded aperture radar by utilizing the coded aperture technique in the direction orthogonal to the direction of travel. In this way one may obtain high resolution using SAR along the direction of travel while also obtaining high resolution in the orthogonal direction using a coded aperture array. This will result in significantly lower system cost and power than conventional SAR arrays.

Figure 6:
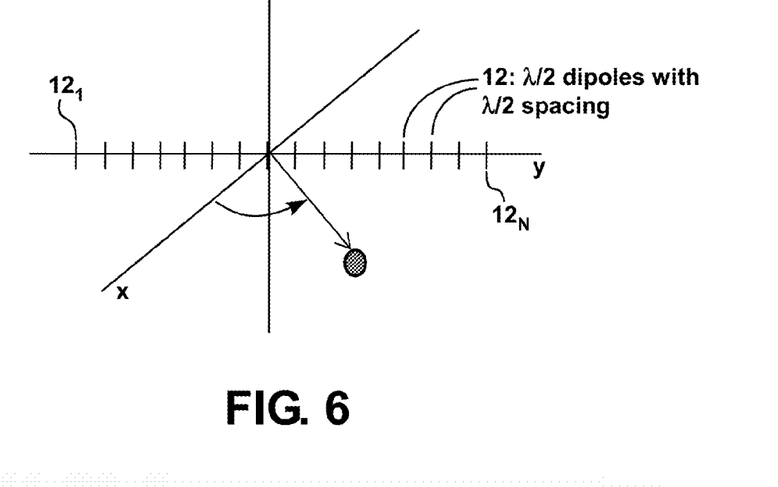
FIG. 6 is depicts the orientation of the computer simulation of the modeled half wave dipoles with a half wavelength spacing between adjacent dipoles with the indicated geometry thereof.

An FMCW coded aperture radar was simulated to demonstrate the effectiveness of the described approach. Simulations were performance with aperture coding on both Tx and Rx, and well as Rx only, and both showed comparable performance. The simulations results described below are for the radar with aperture coding on Rx only. The antenna array model consists of sixteen half wavelength dipoles oriented along the z-axis and equally spaced half a wavelength apart along the y-axis, as shown in FIG. 6. The geometry of the array was chosen specifically so that beam patterns may be evaluated in the x-y plane, allowing us to set the polar angle $\theta=\pi/2$ and consider the single bearing angle $\phi$. The summation network was modeled as an ideal network of Wilkinson power combiners, networks well known to those skilled in the art, with 16 inputs and a single output.

The dissipative losses inherent in the power combining network was included in the simulation. Ideal binary phase shifters were inserted between the summation network inputs and the antenna elements and provided either zero or 180 degrees of phase shift. The states of the phase shifters were chosen randomly for each element and for each code index k, with a 50% probability for each phase shifter state. A total of K=256 different codes were selected for the simulation.

Figure 7:
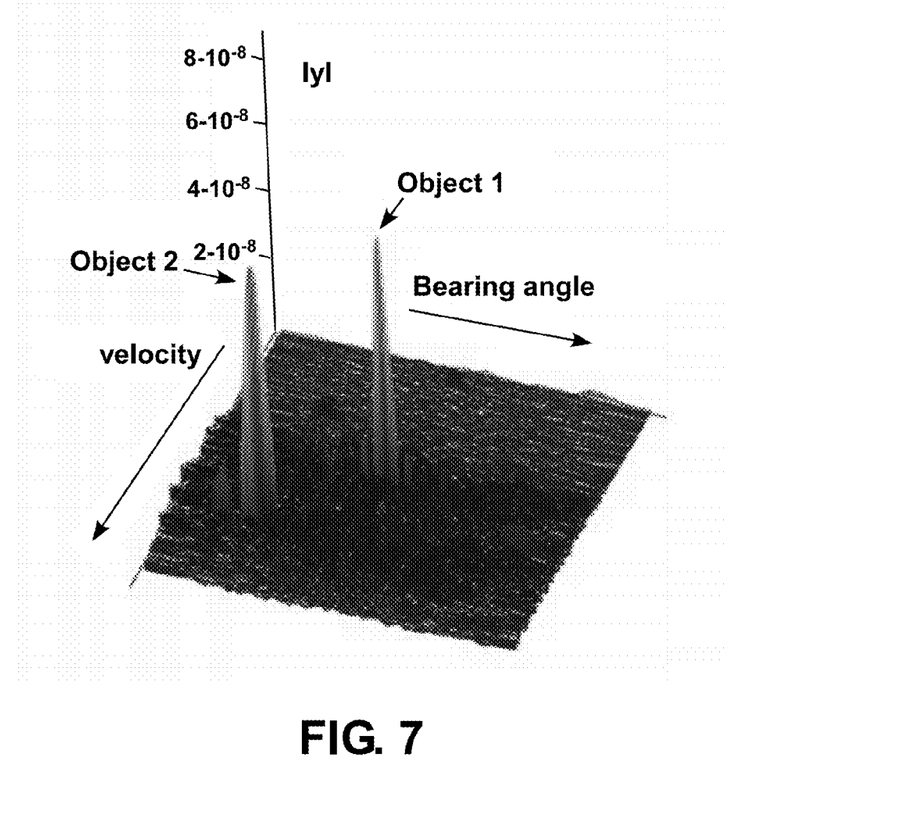
FIG. 7 is a plot of simulated scattering amplitude y as a function of velocity and bearing angle for reference ranges equal to the objects' actual range.
Figure 8:
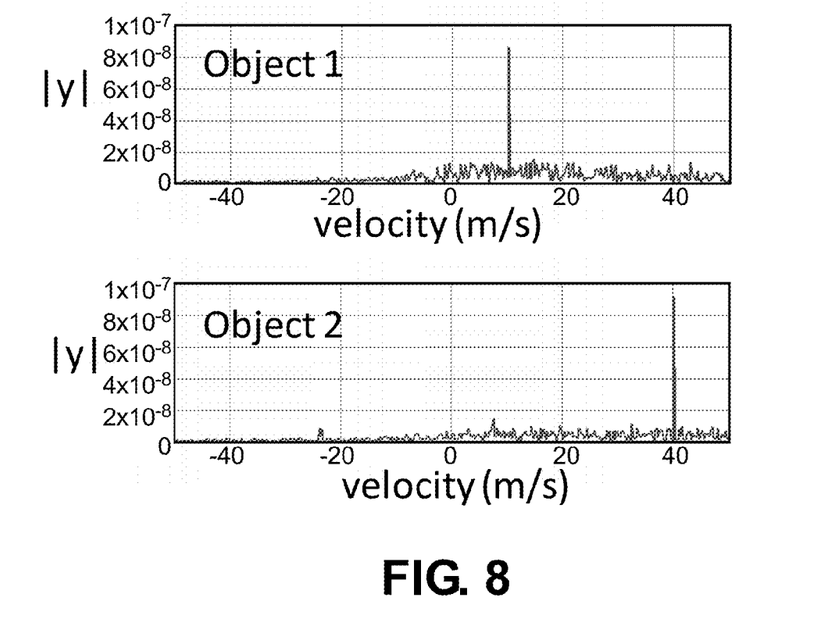
FIG. 8 is a plot of scattering amplitude for the two scattering objects vs velocity for reference ranges and bearing angles equal to the objects' ranges and bearing angles.
Figure 9:
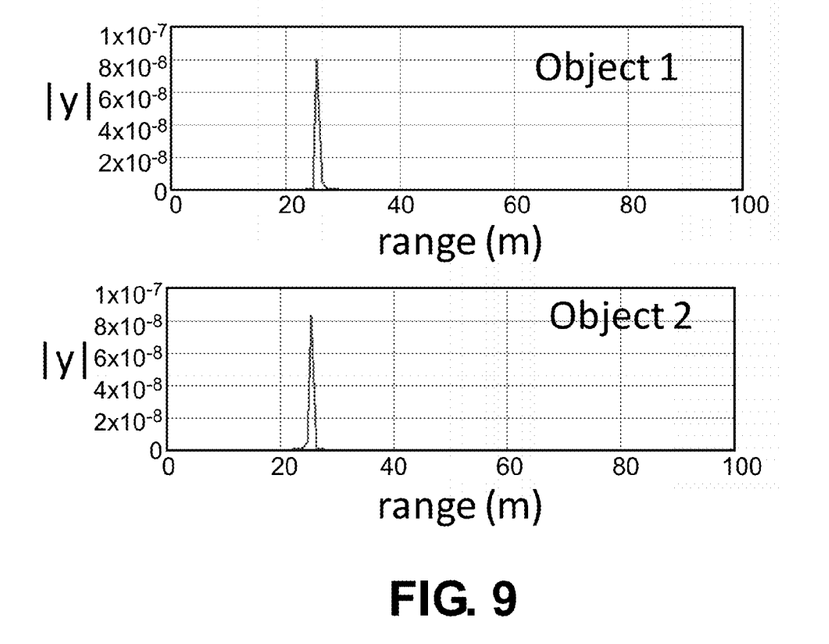
FIG. 9 is a plot of scattering amplitude for the two scattering objects vs range for reference velocities and bearing angles equal to the objects' velocities and bearing angles.
Figure 10:
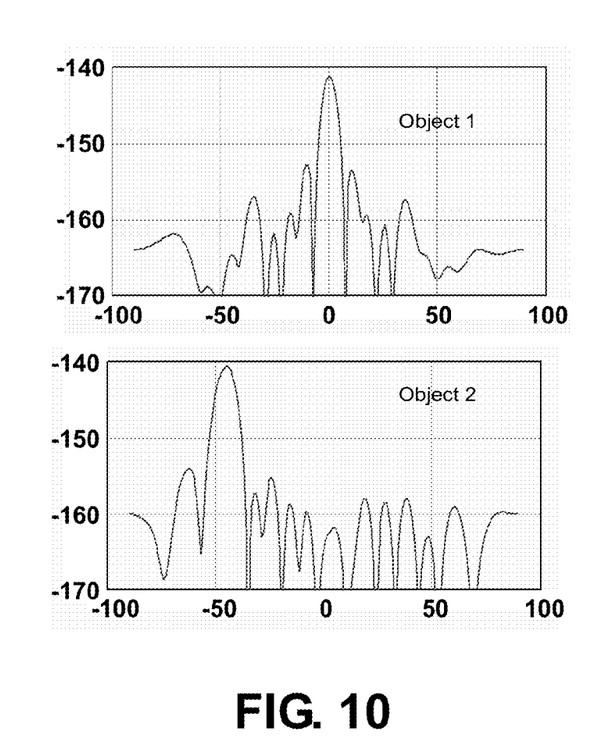
FIG. 10 is a plot of the scattering amplitude for the two scattering objects as a function of bearing angle for the reference range r' and velocity v' equal the range and velocities of the objects.

The simulation parameters were set to model an RF center frequency of 24 GHz with 200 MHz sweeps and a sweep period of 97.7 μsec. Thus, with 256 sweeps the total acquisition period was 25 msec. The simulator modeled two scattering objects, both located at a radial distance of 25.5 m, but with object 1 traveling at a radial velocity of 10.125 m/sec at a bearing angle of φ=0 deg and object 2 traveling at a radial velocity of 40.125 m/sec at a bearing angle of φ=−45 deg . FIG. 7 shows a three dimensional plot of the simulated magnitude of the scattering amplitude y from as a function of the bearing angle and the radial velocity for the reference range r' equal to the objects' ranges. FIG. 8 shows plots of the scattering amplitude for the two objects as a function of velocity for the reference range r' and angle φ' equal the ranges and bearing angles of the objects. Note that the scattering objects may be clearly observed and their ranges determined from the plots. FIG. 9 shows plots of the scattering amplitude for the two objects as a function of range for the reference velocity v' and angle φ' equal the velocities and bearing angles of the objects. Note that the scattering objects may be clearly observed and their velocities determined from the plots. The low level of "noise" along the velocity axis is an unavoidable consequence of the coded aperture radar technique and the mean square level of the noise is approximately 1/K below the peak, indicating that longer codes give better selectivity. FIG. 10 shows plots of the scattering amplitude for the two objects as a function of bearing angle for the reference range r' and velocity v' equal the range and velocities of the objects. For this plot there was no amplitude weighting applied so the beam patterns are similar to those obtained for uniform aperture weighting. Those skilled in the art will appreciate that the spatial beamwidth produced by the radar is determined using the same considerations as for conventional phased array antennas (e.g., the beamwidth is inversely proportional to the physical size of the antenna array, element spacing should be less than λ to avoid grating lobes, etc.).

Figure 11:
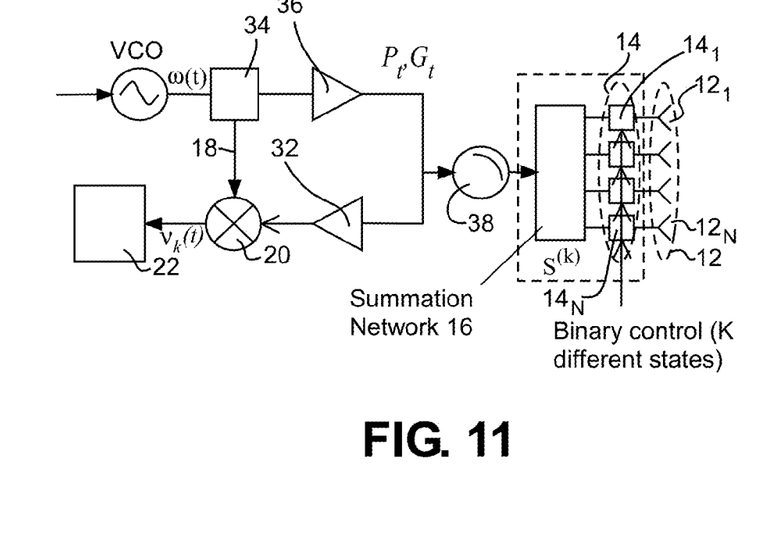
FIG. 11 is a block diagram of an embodiment of a coded aperture radar using a single antenna for both transmit and receive.

If desired, one may implement coded aperture radar using only a single antenna array 12 for both transmit and receive (see the embodiment of FIG. 11), with a circulator 38 inserted to direct the signals properly. The circulator 38 directs the signals from the Power Amplifier (PA) 36 to the antenna 12 during transmission and directs received signals from the antenna 12 to the LNA 32 during reception. In this embodiment, the performance achieved using aperture coding is the same as for the two antenna embodiment of FIG. 3 when the same binary code is used for the antenna array 12 during both transmit and receive.

As briefly noted above, this invention can also be applied to conventional phased array hardware, but with the multi-bit phase shifters thereof operated in the "coded aperture" mode described herein where the multi-bit phase shifters of these prior art systems are operated with a single bit (as singe bit phase shifters). The result is an acquisition time reduced by a factor approximately equal to the number of antenna beams within the field of view.

So, in one aspect, this invention provides a technique for operating a conventional phased array radar in a manner which allows range and radial velocity estimates of all scatterers within the field of view in the same amount of time it takes for the phased array radar to form the range and velocity estimates for a single beam. Although the resulting signal to noise ratio (SNR) for this method is approximately N times lower, for some applications the ability to quickly collect information over the entire field of view is worth this trade off. Once the data is collected the phased array radar may then operate in its normal mode and collected more detailed information (higher SNR) in particular directions.

This is achieved this using the CAR technique described above. Summarizing, the CAR technique utilizes only two phase states for each of the phase shifters, for example either 0 or 180 degrees. For each frequency sweep, or possibly each frequency step, the phase shifter states are set to different values, with each set of values comprising an aperture code. After the set of frequency sweeps is finished, the collected data is digitally processed using, for example, matched filter techniques known per se in the prior art, but taking into account the known states of the Tx and/or Rx phase shifters (as described above). The results of this process are estimates of range, velocity, and bearing angles for all scatterers within the field of view.

For a linear FM transmit signal the frequency is swept through a range of values (the RF bandwidth). This is often depicted as a continuous sweep. But in practice, one may implement the modulation in discrete frequency steps where the frequency is held constant for a period of time before it is moved to the next step.

This concludes the description of the preferred embodiments of the present technology. The foregoing description of one or more embodiments of the technology has been presented for the purposes of illustration and description. It is not intended to be exhaustive or to limit the technology to the precise form disclosed. Many modifications and variations are possible in light of the above teaching. It is intended that the scope of the technology be limited not by this detailed description, but rather by the claims appended hereto.

The invention claimed is:

1. An apparatus for determining a direction of arrival of at least one RF signal from at least one source of the at least one RF signal, the apparatus comprising:
   an array of antenna elements for receiving the at least one RF signal;
   an array of modulators, each modulator in said array of modulators being coupled with a corresponding antenna element in said array of antenna elements and each modulator in said array of modulators modulating the signal from each corresponding antenna element during a predetermined number of successive time periods according to a different associated bit of a single aperture code, a different aperture code being associated to each of said predetermined number of time periods;
   a mixer;
   a summation network for applying a summation of signals from the array of modulators to said mixer, the mixer converting the summation of signals either to baseband or to intermediate frequency analog signals;
   an analog to digital convertor for detecting and converting the baseband or intermediate frequency analog signals from the mixer to corresponding digital signals; and
   means for analyzing the corresponding digital signals to determine the direction of arrival of the at least one RF signal from the at least one emitting source of the at least one RF signal.

2. The apparatus of claim 1 wherein the array of modulators comprise an array of two state phase shifters.

3. The apparatus of claim 2 wherein the means for analyzing the corresponding digital signals comprises at least a programmable gate array.

4. The apparatus of claim 2 wherein the means for analyzing the corresponding digital signals comprises at least a digital signal processor.

5. The apparatus of claim 2 wherein the means for analyzing the corresponding digital signals comprises at least a digital signal processor and a CPU.

6. The apparatus of claim 5 wherein the digital signal processor provides emitting source signal strength estimates in a direction coordinate system and the CPU (i) compares the emitting source signal strength estimates to locate one or more signal peaks which exceed some threshold and (ii) provides corresponding direction coordinates corresponding to the one or more signal peaks to define the direction of arrival of the at least one RF signal from the at least one emitting source.

7. The apparatus of claim 6 wherein the at least one source of the at least one RF signal is a reflection of the at least one RF signal off of an object whose direction relative to the array of antenna elements is to be determined.

8. The apparatus of claim 7 wherein the apparatus also includes a transmitter for transmitting the at least one RF signal which is reflected from said object.

9. The apparatus of claim 8 wherein the transmitter is coupled to said array of antenna elements, the array of antenna elements receiving the at least one RF signal during a first reception interval and the array of antenna elements transmitting the at least one RF signal during a second reception interval.

10. The apparatus of claim 9 including a circulator and wherein the array of antenna elements is coupled with said array of modulators via said circulator and wherein the array of antenna elements is also coupled with said transmitter via said circulator.

11. The apparatus of claim 8 wherein the transmitter is coupled with a second array of antenna elements, the second array of antenna elements transmitting the at least one RF signal during a first reception interval and the first mentioned array of antenna elements transmitting the at least one RF signal during a second reception interval.

12. The apparatus of claim 11 wherein the transmitter is coupled with the second array of antenna elements via a second array of modulators, each modulator in said second array of modulators being coupled with a corresponding antenna element in said second array of antenna elements for modulating signals for the corresponding antenna elements according to a single bit of a second aperture code.

13. The apparatus of claim 12 wherein the second aperture code used a transmission interval and the first aperture code used during an immediately following reception interval are identical codes.

14. The apparatus of claim 12 wherein the second aperture code is utilized during a transmission interval and the first aperture code is utilized during an immediately following reception interval.

15. The apparatus of claim 6 wherein the at least one source of the at least one RF signal is an RF transmission source whose direction relative to the array of antenna elements is to be determined.

16. The apparatus of claim 1 wherein the array of modulators comprises an array of single bit modulators.

17. An apparatus for determining a direction of arrival of at least one RF signal from at least one source of the at least one RF signal reflected from an object, the apparatus comprising:
a receiving antenna and a transmitting antenna, at least one of the receiving antenna and the transmitting antenna comprising an array of antenna elements for transmitting or receiving the at least one RF signal; and
at least one array of single bit modulators, each single bit modulator in said at least one array of single bit modulators being coupled with a corresponding antenna element in said array of antenna elements for modulating the signal for or from each corresponding antenna element during a predetermined number of successive time periods according to a state of a different associated bit of a single aperture code, a different aperture code being associated to each of said predetermined number of time periods, the aperture codes each having two states with approximately a 50% probability for either of the two states occurring in each given aperture code in said sequence of said aperture codes.

18. The apparatus of claim 17 wherein transmitted and/or received energy is 0/180 degree phase encoded with respect to each element in the array of antenna elements by a corresponding single bit modulator in said at least one array of single bit modulators according to the sequence of aperture codes supplied to said at least one array of single bit modulators.

19. A method for determining the range, radial velocity, and bearing angles of scattering objects reflecting signals or for determining the range and bearing angle of sources of signals, the method comprising:
utilizing an array of antenna elements, the array of antenna elements each having an associated two state modulator,
during a predetermined number of successive time periods, coding each transmitted and/or received energy according to a different associated bit of a single aperture code, a different aperture code being associated to each of said predetermined number of time periods,
thereby allowing the determination of range, radial velocity, and bearing angles through digital computation after the scattered signals have been received.

20. The method of claim 19 wherein transmitted and/or received energy is 0/180 degree phase encoded with respect to each element of the array of antenna elements according to the aperture codes associated to each of said predetermined number of time periods.

21. The method of claim 19 wherein the bits of the aperture codes each have two states with approximately a 50% probability for each of the two states occurring in each given aperture code in a sequence of aperture codes.

22. An apparatus for determining a direction of arrival of at least one RF signal from at least one source of the at least one RF signal reflected and/or emitted from an object, the apparatus comprising:
a receiving antenna comprising an array of antenna elements for receiving the at least one RF signal; and
at least one array of phase modulators, each phase modulator in said at least one array of modulators being coupled with a corresponding antenna element in said array of antenna elements for modulating the signal from each corresponding antenna element during a predetermined number of successive time periods according to a state of a different associated bit of a single aperture code, a different aperture code being associated to each of said predetermined number of time periods, each bit of the aperture codes having two states with approximately a 50% probability for either of the two states occurring in each given aperture code associated to each of said predetermined number of time periods.

23. The apparatus of claim 22 wherein received RF signal energy is 0/180 degree phase encoded with respect to each element in the array of antenna elements by a corresponding modulator in said at least one array of modulators according to the state of said bit of the aperture codes corresponding thereto supplied to said at least one array of modulators.

24. The apparatus of claim 22 wherein the phase modulators in said at least one array of phase modulators are each single bit phase modulators.

25. An apparatus for determining a direction of arrival of at least one RF signal from at least one source of the at least one RF signal reflected and/or emitted from an object, the apparatus comprising:
a receiving antenna comprising an array of antenna elements for receiving the at least one RF signal; and
at least one array of phase modulators, each phase modulator in said at least one array of modulators being operated as a single bit modulator and being coupled with a corresponding antenna element in said array of antenna elements for, during a predetermined number of successive time periods, modulating the signal from each corresponding antenna element element according to a state of a different associated bit of a single aperture code, a different aperture code being associated to each of said predetermined number of time periods.

26. The apparatus of claim 25 wherein received RF signal energy is 0/180 degree phase encoded with respect to each element in the array of antenna elements by a corresponding modulator in said at least one array of modulators according to the state of said bit of the aperture code supplied to said at least one array of modulators.

27. An apparatus for transmitting at least one RF signal, the apparatus comprising:
a transmitting antenna comprising an array of antenna elements for transmitting the at least one RF signal; and
at least one array of phase modulators, each phase modulator in said at least one array of modulators being operated as a single bit modulator and being coupled with a corresponding antenna element in said array of antenna elements for, during a predetermined number of successive time periods, modulating transmission signal supplied to each corresponding antenna element according to a state of a different associated bit of a single aperture code, a different aperture code being associated to each of said predetermined number of time periods.

28. The apparatus of claim 27 wherein transmitted RF signal energy is 0/180 degree phase encoded with respect to each element in the array of antenna elements by a corresponding modulator in said at least one array of modulators according to the state of said bit of the aperture code supplied to said at least one array of modulators.

29. An apparatus for determining a direction of arrival of at least one RF signal from at least one source of the at least one RF signal reflected and/or emitted from an object, the apparatus comprising:
a receiving antenna comprising an array of antenna elements for receiving the at least one RF signal; and
at least one array of single bit phase modulators, each single bit phase modulator in said at least one array of single bit modulators being coupled with a corresponding antenna element in said array of antenna elements for, during a predetermined number of successive time periods, modulating the signal from each corresponding antenna element according to a state of a different associated bit of a single aperture code, a different aperture code being associated to each of said predetermined number of time periods.

30. The apparatus of claim 29 wherein the aperture codes each have two states with approximately a 50% probability for either of the two states occurring in each given aperture code in said different aperture codes being associated to each of said predetermined number of time periods.

31. The apparatus of claim 29 wherein received RF signal energy is 0/180 degree phase encoded with respect to each element in the array of antenna elements by a corresponding single bit modulator in said at least one array of single bit modulators according to the state of said bit of the aperture code supplied to said at least one array of single bit modulators.

* * * * *